(12) United States Patent
Hirao

(10) Patent No.: US 9,917,970 B2
(45) Date of Patent: Mar. 13, 2018

(54) IMAGE READING APPARATUS, METHOD FOR CONTROLLING THE SAME, AND STORAGE MEDIUM

(71) Applicant: CANON KABUSHIKI KAISHA, Tokyo (JP)

(72) Inventor: Toyomi Hirao, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/391,741

(22) Filed: Dec. 27, 2016

(65) Prior Publication Data

US 2017/0111539 A1 Apr. 20, 2017

Related U.S. Application Data

(63) Continuation of application No. 14/729,980, filed on Jun. 3, 2015, now Pat. No. 9,571,694.

(30) Foreign Application Priority Data

Jun. 6, 2014 (JP) ................. 2014-118112

(51) Int. Cl.
*H04N 1/04* (2006.01)
*H04N 1/00* (2006.01)
*G06K 9/68* (2006.01)

(52) U.S. Cl.
CPC ......... *H04N 1/0443* (2013.01); *G06K 9/6857* (2013.01); *H04N 1/00822* (2013.01);
(Continued)

(58) Field of Classification Search
CPC ............. H04N 1/0402; H04N 1/00737; H04N 1/00774; H04N 1/00801; G06T 3/4053;
(Continued)

(56) References Cited

U.S. PATENT DOCUMENTS 6,396,507 B1 * 5/2002 Kaizuka ................ G06T 3/0025
345/660
6,965,463 B1 * 11/2005 Moritaku ............... H04N 1/486
348/262

(Continued)

FOREIGN PATENT DOCUMENTS

JP 2003-179719 A 6/2003
JP 2006-135697 A 5/2006
(Continued)

*Primary Examiner* — Negussie Worku
(74) *Attorney, Agent, or Firm* — Canon U.S.A., Inc. IP Division

(57) ABSTRACT

A resolution of an image data needs to be higher than a predetermined value for character recognition. A control method in an image reading apparatus having a reading unit for reading an image of a document to generate image data, and a storing unit for storing the image data generated by the reading unit includes receiving from a user, after the image data is stored by the storing unit, an instruction for executing character recognition processing on the image data stored by the storing unit, executing character recognition processing on the image data stored by the storing unit according to a reception of the instruction by the receiving unit, and performing control, in a case where the image data generated by the reading unit is to be stored by the storing unit, to read an image of a document by the reading unit with a resolution that enables character recognition.

7 Claims, 12 Drawing Sheets

(52) U.S. Cl.
CPC . *G06K 2209/01* (2013.01); *H04N 2201/0081* (2013.01); *H04N 2201/0094* (2013.01)

(58) Field of Classification Search
CPC .................... G06T 1/00; G06T 3/4007; H04Q 2213/13095
USPC ........ 358/474, 1.2, 447, 475, 514, 408, 448, 358/461, 483, 497, 513, 516, 518; 348/311, E3.018, E9.01, 262, 305, 308; 382/167, 317, 318
See application file for complete search history.

(56) References Cited

U.S. PATENT DOCUMENTS

| | | | | |
|---|---|---|---|---|
| 7,651,092 | B2* | 1/2010 | Hirao | B41J 11/006 |
| | | | | 271/256 |
| 8,310,731 | B2* | 11/2012 | Nakajima | G06T 3/4053 |
| | | | | 358/447 |
| 8,310,736 | B2* | 11/2012 | Nakajima | H04N 1/00835 |
| | | | | 358/461 |
| 8,390,876 | B2* | 3/2013 | Hirao | H04N 1/0057 |
| | | | | 358/1.2 |
| 8,437,032 | B2* | 5/2013 | Kakigi | G06T 3/4007 |
| | | | | 358/1.2 |
| 8,503,024 | B2* | 8/2013 | Nakamura | G06T 1/00 |
| | | | | 358/1.2 |
| 8,605,341 | B2* | 12/2013 | Miyazaki | H04N 1/0402 |
| | | | | 358/448 |
| 9,571,694 | B2* | 2/2017 | Hirao | H04N 1/3935 |
| 2002/0122590 | A1* | 9/2002 | Kaneda | G06K 9/6857 |
| | | | | 382/181 |
| 2006/0176509 | A1* | 8/2006 | Aoki | H04N 1/00209 |
| | | | | 358/1.15 |
| 2012/0287444 | A1 | 11/2012 | Osada | |
| 2013/0022270 | A1 | 1/2013 | Kahle | |
| 2016/0337531 | A1* | 11/2016 | Masui | H04N 1/40 |
| 2017/0264782 | A1* | 9/2017 | Hashimoto | H04N 1/387 |

FOREIGN PATENT DOCUMENTS

| | | |
|---|---|---|
| JP | 2009-194562 A | 8/2009 |
| JP | 2013-153521 A | 8/2013 |

* cited by examiner

FIG.7A

| BOX NO. | NAME | USED AMOUNT |
|---|---|---|
| 00 | AAAA | 2% |
| 01 | BBBB | 0% |
| 02 | CCCC | 0% |
| 03 | DDDD | 1% |
| 04 | EEEE | 1% |
| 05 | FFFF | 0% |

SCAN AND SEND

<STORE IN BOX>
SELECT BOX AS DESTINATION.

CANCEL    OK

SYSTEM MANAGEMENT MODE    LOGOUT 710, 711

FIG.7B

USE STORED FILE

<BOX>
SELECT LOCATION OF TARGET FILE.

| BOX NO. | NAME | USED AMOUNT |
|---|---|---|
| 00 | AAAA | 2% |
| 01 | BBBB | 0% |
| 02 | CCCC | 0% |
| 03 | DDDD | 1% |
| 04 | EEEE | 1% |
| 05 | FFFF | 0% |

CANCEL    OK

SYSTEM MANAGEMENT MODE    LOGOUT 720, 721

FIG.7C

```
┌─────────────────────────────────────────────┐
│  USE STORED FILE                            │
├─────────────────────────────────────────────┤
│  <BOX>                                      │
│  SELECT FILE AND SPECIFY PURPOSE OF USE.    │      ~730
│                                             │
│   ✓   NAME    SIZE   PAGE    DATE/TIME      │
│       aaaa    A4      1    JAN. 26 04:29 PM │
│       bbbb    A4      3    JAN. 10 05:01 PM │
│       cccc    A4      2    JAN. 28 11:13 AM │
│       dddd    A4      5    JAN. 27 02:58 PM │  ▲
│   1▶  eeee    A4      2    DEC. 10 05:41 AM │
│       ffff    A4      1    JAN. 30 09:09 AM │  ▼
│                                             │
│   732 ─ [   SEND   ]   731 ─ [   PRINT   ]  │
│                                             │
│  SYSTEM MANAGEMENT MODE         ( LOGOUT )  │
└─────────────────────────────────────────────┘
```

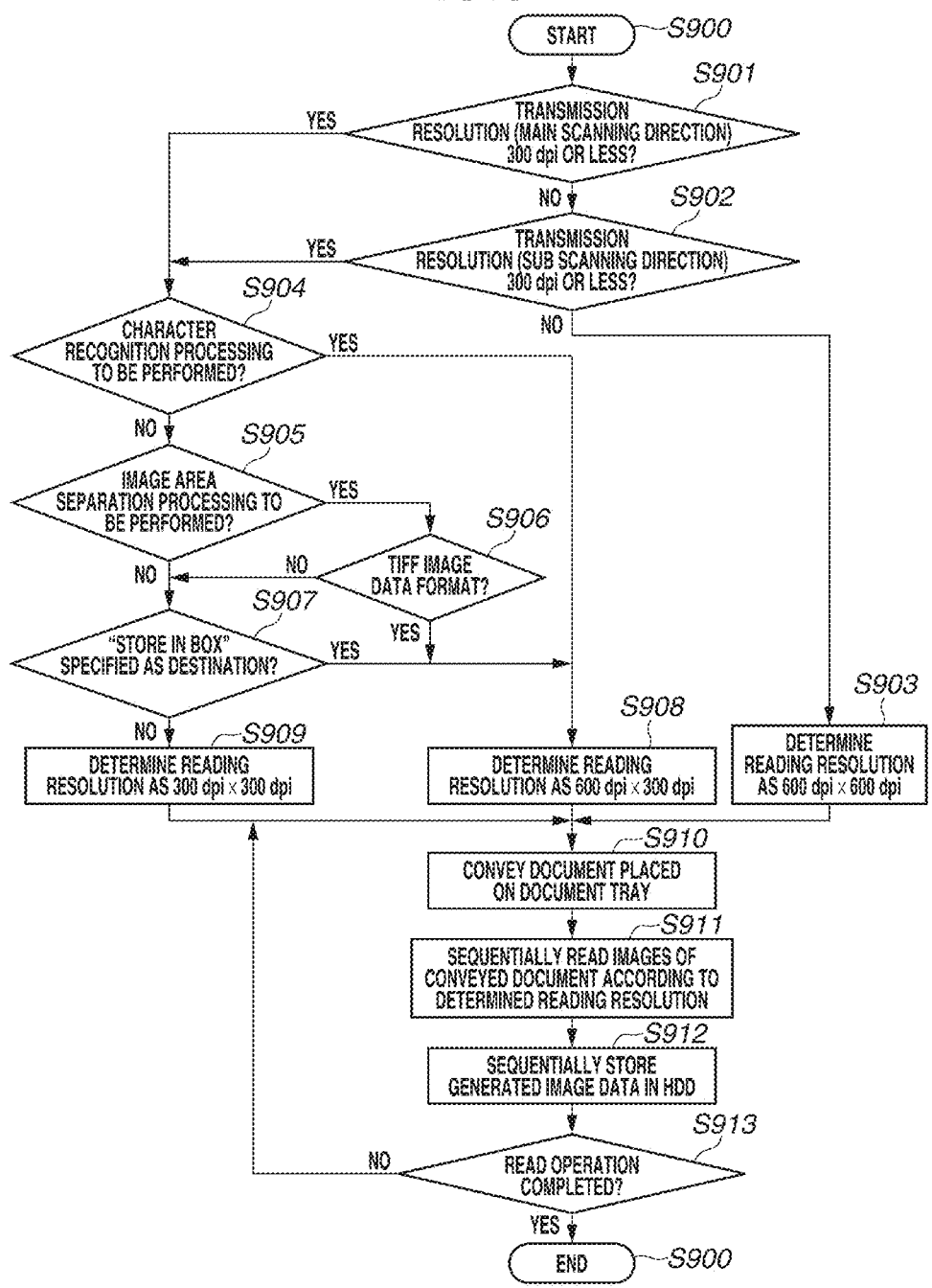

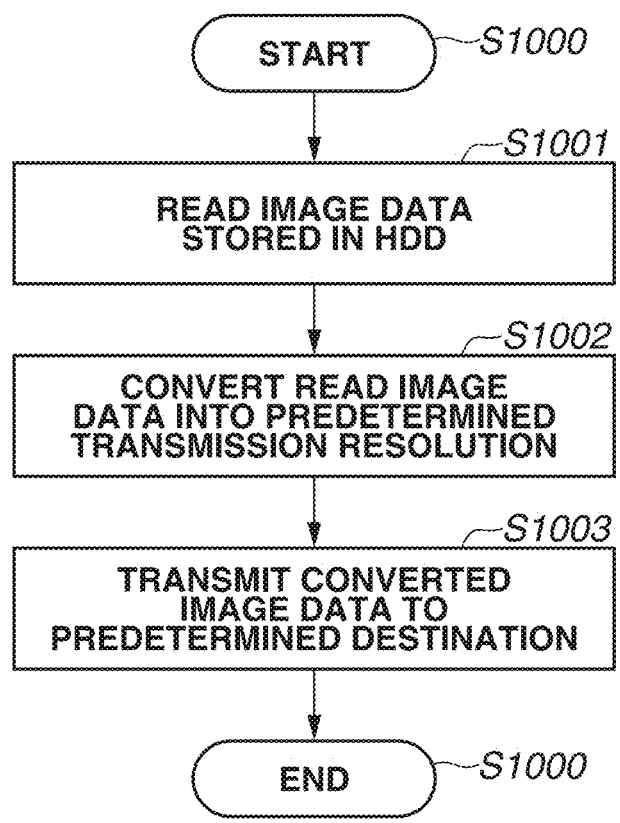

IMAGE READING APPARATUS, METHOD FOR CONTROLLING THE SAME, AND STORAGE MEDIUM

CROSS-REFERENCE TO RELATED APPLICATIONS

This application is a continuation of U.S. patent application Ser. No. 14/729,980, filed Jun. 3, 2015, which claims the benefit of Japanese Patent Application No. 2014-118112, filed Jun. 6, 2014, both of which are hereby incorporated by reference herein in their entirety.

BACKGROUND OF THE INVENTION

Field of the Invention

The present invention relates to an image reading apparatus for reading an image of a document and storing image data of the read document, a method for controlling the image reading apparatus, and a storage medium.

Description of the Related Art

A certain image reading apparatus reads an image of a document and then, to add character information included in the read document to image data as metadata, performs character recognition processing on the image data.

When the character recognition accuracy is determined to be lower than a predetermined value as a result of execution of character recognition processing, the image reading apparatus prompts a user to change reading resolution and then to read an image of the document again (refer to Japanese Patent Application Laid-Open No. 2012-118863).

There is a case where the image reading apparatus reads an image of a document and then, to enable transmitting image data of the read document at an arbitrary timing, stores the image data in a hard disk drive (HDD). There is a case where the image reading apparatus performs file format conversion and further character recognition processing on the image data stored in the HDD. To guarantee character recognition accuracy for such a case, the resolution of the image data needs to be higher than a predetermined value. This is because, if the resolution of the image data stored in the HDD is lower than the predetermined value, the character recognition accuracy cannot be guaranteed after execution of the character recognition processing on the image data.

SUMMARY OF THE INVENTION

According to an aspect of the present invention, an image reading apparatus includes a reading unit configured to read an image of a document to generate image data, a storing unit configured to store the image data generated by the reading unit, a receiving unit configured to receive from a user, after the image data is stored by the storing unit, an instruction for executing character recognition processing on the image data stored by the storing unit, a character recognition unit configured to execute character recognition processing on the image data stored by the storing unit according to a reception of the instruction by the receiving unit, and a control unit configured to perform control, in a case where the image data generated by the reading unit is to be stored by the storing unit, to read an image of the document by the reading unit with a resolution that enables character recognition by the character recognition unit.

Further features of the present invention will become apparent from the following description of exemplary embodiments with reference to the attached drawings.

BRIEF DESCRIPTION OF THE DRAWINGS

FIGS. 7A, 7B, and 7C illustrate screens according to the first exemplary embodiment.

FIG. 9 is a flowchart illustrating an example of control according to the first exemplary embodiment.

FIG. 10 is a flowchart illustrating an example of control according to the first exemplary embodiment.

DESCRIPTION OF THE EMBODIMENTS

Figure 1:
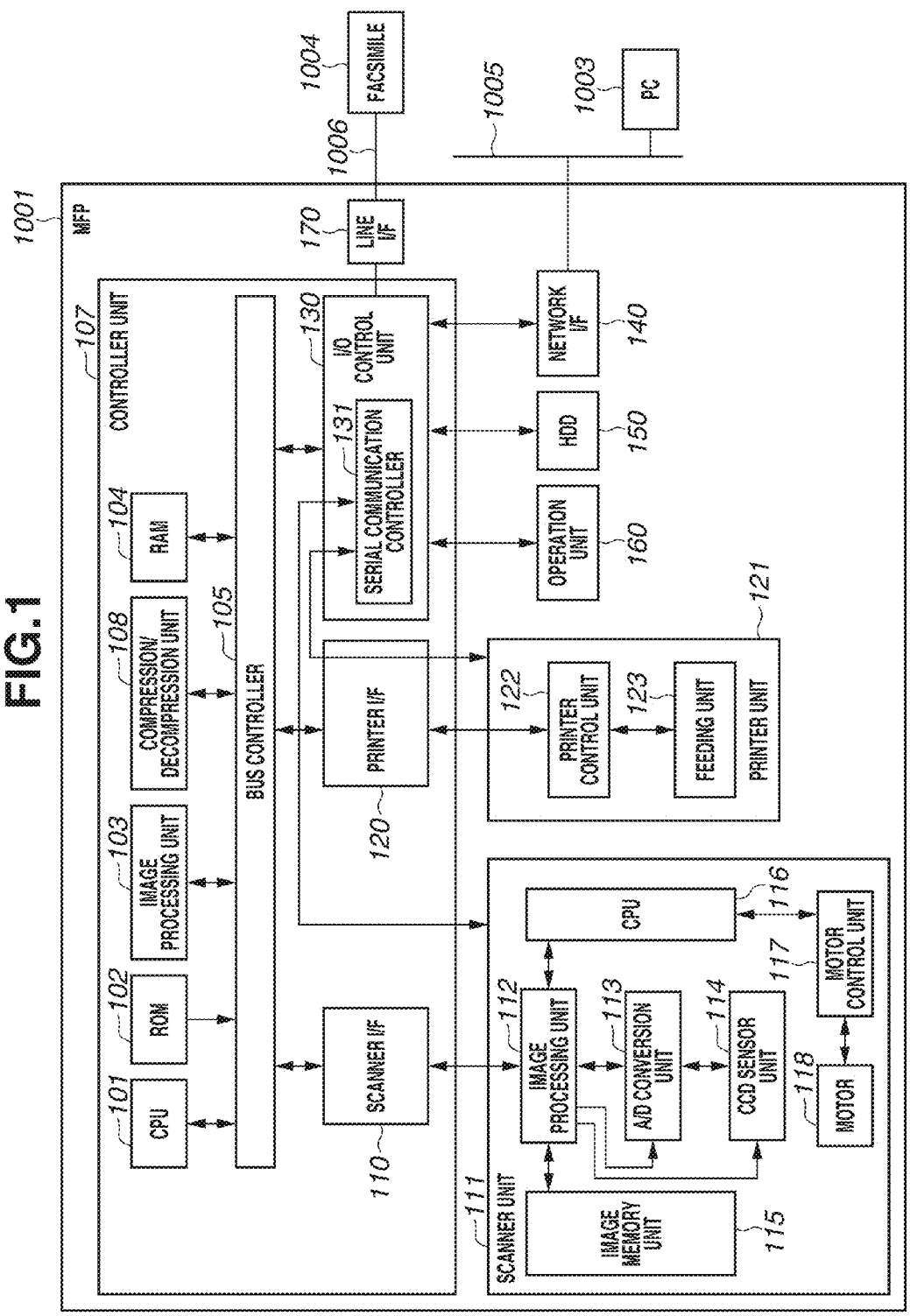
FIG. 1 is a block diagram illustrating a system according to the present exemplary embodiment.

Exemplary embodiments of the present invention will be described in detail below with reference to the accompanying drawings. The following exemplary embodiments do not limit the present invention within the ambit of the appended claims. Not all of the combinations of the features described in the present exemplary embodiment are indispensable to the solutions for the present invention.

A system according to a first exemplary embodiment of the present invention will be described below with reference to FIG. 1.

In the first exemplary embodiment, a central processing unit (CPU) 101 of a controller unit 107 reads an image of a document and then, to enable transmitting image data of the read document at an arbitrary timing, stores the image data in a hard disk drive (HDD) 150. The CPU 101 performs control to guarantee character recognition accuracy even in a case where the CPU 101 reads the image data stored in the HDD 150 and then, for example, to recognize characters included in the read document, performs character recognition processing on the stored image data.

Therefore, when reading an image of a document and then, to enable transmitting image data of the read document at an arbitrary timing, storing the image data in the HDD 150, the CPU 101 performs control to read an image of a document with a predetermined resolution.

The control will be described in detail below.

The system according to the present exemplary embodiment includes a multifunction peripheral (MFP) 1001 as an example of an image reading apparatus for reading an image of a document, a personal computer (PC) 1003 as an external apparatus, and a facsimile 1004.

The MFP 1001 is provided with an image reading function of reading a document to generate image data, and a print function (copy function) of printing an image on a sheet based on the generated image data. The MFP 1001 is further provided with a print function (PC print function) of receiving a print job from an external apparatus such as the PC 1003 and then printing characters and images on a sheet based on the print job.

More specifically, the MFP 1001 serves not only as an image reading apparatus but also as a printing apparatus. Although, in the present exemplary embodiment, the MFP 1001 will be described as an example of an image reading apparatus, the image reading apparatus may be a scanner which reads a document to generate image data and transmits the generated image data to the PC 1003 as long as the scanner is provided with the image reading function. The image reading apparatus may also be a scanner which does not transmit the generated image data to the PC 1003 but stores the generated image data in a detachably attached external memory such as a Universal Serial Bus (USB) memory.

The MFP 1001 is connected to the PC 1003 via a Local Area Network (LAN) 1005 to communicate with the PC 1003.

The MFP 1001 is further connected to the facsimile 1004 via a public line 1006 to communicate with the facsimile 1004.

The PC 1003 inputs a print job to the MFP 1001 via a network such as the LAN 1005. Then, the MFP 1001 processes the print job input from the PC 1003 via a network such as the LAN 1005.

Although, in the present exemplary embodiment, the MFP 1001 and the PC 1003 will be described to be connected to each other via the LAN 1005, the MFP 1001 and the PC 1003 may be connected to each other via a Wide Area Network (WAN) such as the Internet. Alternatively, the MFP 1001 and the PC 1003 may be connected to each other via a USB cable. Further, the MFP 1001 and the PC 1003 may be configured to communicate with each other via wireless communication such as Wireless Fidelity (Wi-Fi) and Bluetooth®.

The PC 1003 generates image data by using application software and transmits the generated image data to the MFP 1001. Although, in the present exemplary embodiment, the PC 1003 is described as an example of an external apparatus, the configuration is not limited thereto. The PC 1003 may be a mobile information terminal such as a personal digital assistant (PDA) and a smart phone, a network connection apparatus, or an external dedicated apparatus.

The MFP 1001 includes a controller unit (control unit) 107, a scanner unit 111, a printer unit 121, a network interface (I/F) 140, a hard disk drive (HDD) 150, an operation unit 160, and a line I/F 170 (described below). These units are electrically connected to transmit and receive control commands or data to/from each other.

The network I/F 140 as an example of a communication unit is an interface for transmitting and receiving image data to/from the PC 1003. On the other hand, the line I/F 170 as an example of a communication unit is an interface for connecting the controller unit 107 to the public line 1006.

The controller unit 107 includes a plurality of functional blocks: the CPU 101, a read only memory (ROM) 102, an image processing unit 103, a random access memory (RAM) 104, a compression/decompression unit 108, a scanner I/F 110, a printer I/F 120, and an input/output (I/O) control unit 130. These units are electrically connected via a bus controller 105 to transmit and receive control commands or data to/from each other.

The CPU 101 controls processing and operations of the scanner unit 111, the printer unit 121, and other various units (such as a feeding unit 123) included in the MFP 1001.

The ROM 102, a read only memory, pre-stores programs such as a boot sequence and font information.

The RAM 104, a readable and writable memory, stores image data, various programs, and setting information transmitted from the scanner unit 111 and the network I/F 140. The RAM 104 is, for example, a Dynamic Random Access Memory (DRAM).

The ROM 102 or HDD 150 stores various control programs required to perform various processing of flowcharts (to be described below) executed by the CPU 101. The ROM 102 or HDD 150 further stores a display control program for displaying various user interface (UI) screens (hereinafter referred to as UI screens) on a display unit of the operation unit 160 (to be described below). The CPU 101 reads programs stored in the ROM 102 or the HDD 150, loads the relevant programs into the RAM 104, and executes them to implement various operations according to the present exemplary embodiment.

The ROM 102 or the HDD 150 further stores a program for implementing an operation that the CPU 101 interprets Page Description Language (PDL) data received from the PC 1003 via the network I/F 140 and then rasterizes the PDL data into raster image data (bitmap image data). The above-described operations are processed by software.

The scanner I/F 110 is an interface for connecting to the scanner unit 111 as an image reading apparatus. On the other hand, the printer I/F 120 is an interface for connecting to the printer unit 121 as an image output apparatus. The controller unit 107 performs synchronous/asynchronous conversion or control on image data via the scanner I/F 110 and the printer I/F 120.

The MFP 1001 further includes a nonvolatile memory such as the HDD 150 for storing jobs as an example of a storage unit. The HDD 150 stores a plurality of pieces of data including system software, job print data, image data converted into a red, green, and blue (RGB) signal by an image processing unit 112 (to be described below), and image data compressed by the compression/decompression unit 108 (to be described below). Although, in the present exemplary embodiment, the HDD 150 is described as an example of a large-capacity nonvolatile storage apparatus, the configuration is not limited thereto. The large-capacity nonvolatile storage apparatus may be other nonvolatile memory such as a Solid State Drive (SSD).

The controller unit 107 is provided with a plurality of functions. For example, the controller unit 107 stores in the HDD 150 image data of a document sheet 203 read by the scanner unit 111. Then, the controller unit 107 reads image data from the HDD 150. Alternatively, the controller unit 107 stores in the HDD 150 a print job received from the PC 1003 via the network I/F 140. Then, the controller unit 107 reads code data from the HDD 150 and converts it into image data.

The controller unit 107 further executes a print function of printing an image on a sheet based on the image data via the printer unit 121. Alternatively, the controller unit 107 executes a scanner function of converting image data of the document sheet 203 read by the scanner unit 111 into code data and of transmitting it to the PC 1003 via the network I/F 140.

The scanner unit 111 includes the image processing unit 112, an analog-to-digital (A/D) conversion unit 113, a charge-coupled device (CCD) sensor unit 114, an image memory unit 115, a CPU 116, a motor control unit 117, and a motor 118. The scanner unit 111 is electrically connected via a serial communication controller 131 in the I/O control unit 130.

The motor 118 is driven to move an exposure unit 213 and a mirror unit 214 (to be described below) of the scanner unit 111.

Although the controller unit 107 will be described to instruct the motor 118 to move the exposure unit 213 and the mirror unit 214 via the motor control unit 117, the configuration is not limited thereto. For example, the CPU 116 of the scanner unit 111 may directly instruct the motor 118 to move the exposure unit 213 and the mirror unit 214.

The image data of the document sheet 203 read by the CCD sensor unit 114 as an analog signal is converted into a digital signal by the A/D conversion unit 113. Then, the digital signal is converted into an RGB signal by the image processing unit 112. The RGB signal is temporarily stored in the RAM 104 via the scanner I/F 110 of the controller unit 107 and the bus controller 105. Then, the image data is stored in the HDD 150 via the I/O control unit 130, under the control of the CPU 101 of the controller unit 107.

When printing the image data stored in the HDD 150, the image data stored in the HDD 150 is temporarily stored in the RAM 104, under the control of the CPU 101 of the controller unit 107. The image data temporarily stored in the RAM 104 is subjected to color space conversion, for example, from RGB to a cyan, magenta, yellow, and key black (CMYK), by the image processing unit 103 and then is transferred to the printer unit 121 via the printer I/F 120. The printer unit 121 includes a printer control unit 122 for controlling communication with the controller unit 107. The printer unit 121 further includes a feeding unit (sheet holding unit) 123 having a plurality of cassettes or a manual feed tray for storing sheets used for printing. The printer unit 121 is electrically connected via the serial communication controller 131 in the I/O control unit 130.

The printer unit 121 performs print processing for a print target job stored in the HDD 150. The controller unit 107 instructs the printer unit 121 to print image data via the printer control unit 122. The printer unit 121 transfers and fixes a toner image formed based on image data onto a sheet fed from the feeding unit 123, thus forming (printing) an image on the sheet by using toner. Transfer and fixing will be described in detail below.

The compression/decompression unit 108 includes an image processing block for performing compression/decompression processing on the image data stored in the RAM 104 and the HDD 150 based on various compression methods such as Joint Bi-level Image Experts Group (JBIG) and Joint Photographic Experts Group (JPEG), and then for storing again the processed data in the RAM 104. The controller unit 107 transmits the image data compressed by the compression/decompression unit 108 to the PC 1003 via the network I/F 140.

The controller unit 107 receives the image data from the PC 1003 via the network I/F 140. When storing in the HDD 150 the image data received via the network I/F 140, the controller unit 107 compresses the image data in via the compression/decompression unit 108. On the other hand, when printing an image on a sheet based on the image data stored in the HDD 150, the controller unit 107 decompresses the image data via the compression/decompression unit 108.

The MFP 1001 includes the operation unit 160 having a display unit (not illustrated) as an example of a user interface unit. The operation unit 160 of the MFP 1001 includes a display unit and hardware keys. The display unit is composed of a liquid crystal display (LCD) and a touch panel sheet having transparent electrodes (capacitance type is also possible) stuck on the LCD. The LCD displays operation screens and statuses of the MFP 1001. The operation unit 160 is provided with functions of receiving various settings from a user and of providing the user with information via relevant operation screens and hardware keys.

Figure 2:
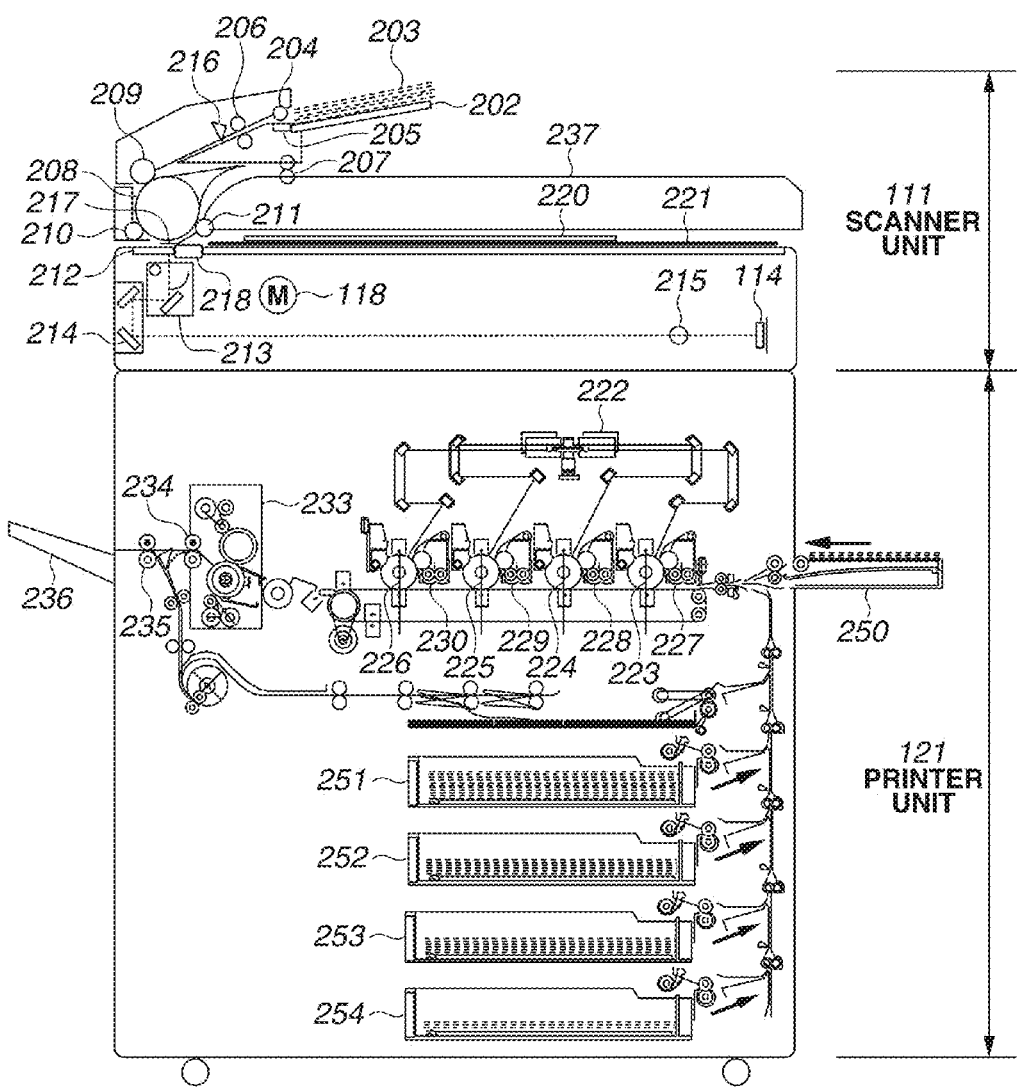
FIG. 2 is a sectional view illustrating a configuration of a multifunction peripheral (MFP) according to the present exemplary embodiment.

FIG. 2 is a sectional view illustrating the scanner unit 111 and the printer unit 121 illustrated in FIG. 1. The following describes an operation for reading an image of the document sheet 203 placed on a document tray 202 of an Auto Document Feeder (ADF).

The document sheets 203 placed on the document tray 202 of the ADF are conveyed one by one by a pair of a document feeding roller 204 and a separating pad 205. Then, each of the conveyed document sheets 203 is sent into the apparatus by a conveyance roller pair 206. The document sheet 203 conveyed by the conveyance roller pair 206 is detected by a document passage detection sensor 216. As to whether a first sheet of the document sheet 203 has passed is determined based on a detection time.

The document sheet 203 sent into the apparatus by the conveyance roller pair 206 is conveyed by a large roller 208 and a roller 209, and is further conveyed by the large roller 208 and a roller 210. The document sheet 203 conveyed between the larger roller 208 and a document guide plate 217 in contact with a document glass 212 passes through a jump plate 218, and is further conveyed by the large roller 208 and a roller 211. Then, the document sheet 203 is discharged onto a document discharge tray 237 by a document discharge roller pair 207.

When the document sheet 203 passes through the document glass 212, the surface in contact with the document glass 212 is exposed to light by the exposure unit 213, and an image of the document sheet 203 is read in a main and a sub scanning directions. Resultant reflected light from the document sheet 203 is transmitted to the mirror unit 214 via a plurality of mirrors. After the transmitted reflected light passes through a lens 215 and then is condensed, the reflected light is converted into an electrical signal by the CCD sensor unit 114. Image data output from the CCD sensor unit 114 is subjected to the above-described predetermined processing and then is transferred to the controller unit 107.

Although, in the present exemplary embodiment, an optical system included in the scanner unit 111 is described to be a reducing optical system which focuses the reflected light from the document sheet 203 on the CCD sensor unit 114, the configuration is not limited thereto. The optical system included in the scanner unit 111 may be an equal magnification optical system which focuses the reflected light from the document sheet 203 on a Contact Image Sensor (CIS).

The CIS includes photoelectric conversion elements such as a CCD (generally, a plurality of photoelectric conversion elements arranged in a row). The image memory unit 115 includes a First In First Out (FIFO) unit for accumulating an image of each element. Control signals for controlling the FIFO unit and the CCD are simultaneously generated.

In signal reading onto the CIS, the CPU 116 controls an amount of read data by using a "read clock 301" for reading an image from each pixel and a "transfer enable clock 302" for controlling whether the read pixel is to be transferred to the controller unit 107. Thinning processing in the main scanning direction in reading an image of the document sheet 203 (hereinafter simply referred to as thinning processing in the main scanning direction) is implemented by changing a clock frequency of the transfer enable clock 302.

Figure 3A:
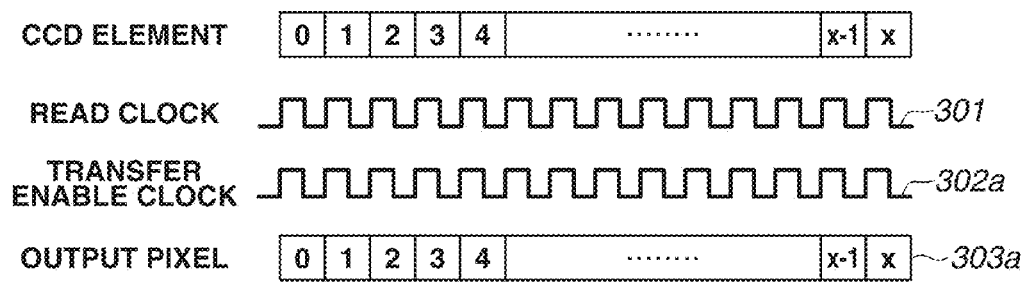
FIGS. 3A and 3B illustrate thinning processing in a main scanning direction performed when reading an image of a document.
Figure 3B:
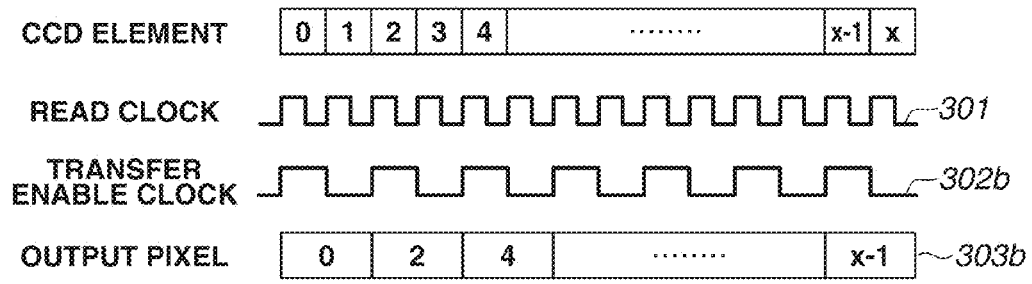

FIG. 3A illustrates a case where image data of the document sheet 203 read without thinning the number of pixels is input to the controller unit 107. On the other hand, FIG. 3B illustrates a case where image data of the document sheet 203 read by thinning the number of pixels to one half is input to the controller unit 107.

Data reading from each photoelectric conversion element is controlled by the read clock 301. Data of each element is read from the CIS on a rising edge of the read clock 301. The transfer enable clock 302 is input for the read data. Then, data of each pixel is captured to the FIFO unit of the CIS in synchronization with the rising edge of the transfer enable clock 302.

FIG. 3A illustrates a transfer enable clock 302a when the thinning processing in the main scanning direction is not performed (on a regular thinning basis). On the other hand, FIG. 3B illustrates a transfer enable clock 302b when the thinning processing in the main scanning direction is performed (on a ½ thinning basis). The transfer enable clock 302b on a ½ thinning basis has a half clock frequency of the transfer enable clock 302a on a regular thinning basis. As described above, each pixel is captured to the FIFO unit in synchronization with the rising edge of the transfer enable clock 302. Therefore, when the transfer enable clock 302 has a half frequency, an element which is not captured to the FIFO unit is generated for each pixel, thus achieving ½ thinning processing (refer to output pixels 303a and 303b). Then, data captured to the FIFO unit is suitably transferred to the controller unit 107.

The document feeding roller 204, the conveyance roller pair 206, the large roller 208, the rollers 209, 210, and 211, and the document discharge roller pair 207 are driven by a stepping motor (not illustrated). When these rollers are driven, increasing the frequency of an input pulse to the stepping motor increases a rotational speed of the stepping motor. An increase in the rotational speed of the stepping motor increases an amount of movement per unit time. Accordingly, the number of lines for scanning an image of the document sheet 203 decreases when the same area is scanned.

For example, when the rotational speed of the stepping motor is doubled, the number of pixels scanned by read processing in the sub scanning direction on an image of the document sheet 203 can be thinned out to one half (hereinafter referred to as thinning processing in the sub scanning direction). Likewise, when the rotational speed of the stepping motor is quadrupled, the number of pixels scanned by the read processing in the sub scanning direction on an image of the document sheet 203 can be thinned out to one fourth.

As described above, the thinning processing can be performed on an image of the document sheet 203 in each of the main and the sub scanning directions.

The scanner unit 111 receives from the controller unit 107 an instruction as to whether each of the thinning processing in the main scanning direction and the thinning processing in the sub scanning direction is to be performed. Then, the scanner unit 111 performs the thinning processing according to the instruction and inputs the image data of the read document sheet 203 to the controller unit 107.

When ½ thinning processing in the main scanning direction is performed, reading resolution in the main scanning direction is halved. More specifically, in a case where the reading resolution in the main scanning direction is preset to 600 dots per inch (dpi), performing the ½ thinning processing in the main scanning direction changes the reading resolution in the main scanning direction to 300 dpi.

Likewise, when the ½ thinning processing in the sub scanning direction is performed, the reading resolution in the sub scanning direction is halved. More specifically, in a case where the reading resolution in the sub scanning direction is preset to 600 dpi, performing the ½ thinning processing in the sub scanning direction changes the reading resolution in the sub scanning direction to 300 dpi.

Performing the thinning processing in the main scanning direction or the thinning processing in the sub scanning direction enables increasing the speed of reading an image of the document sheet 203. On the other hand, as described above, performing the thinning processing in the main scanning direction or the thinning processing in the sub scanning direction reduces the reading resolution.

On the other hand, depending on a file format setting at the time of reading an image of the document sheet 203 to generate image data, character recognition processing may be performed on the image data to add character information included in the read document sheet 203 to the image data as metadata. In this case, correct character recognition on the document sheet 203 (hereinafter referred to as character recognition accuracy) is required. Therefore, when the character recognition accuracy is required, a higher reading resolution than a predetermined value is desirable to generate high definition image data by reading an image of the document sheet 203. More specifically, when the character recognition accuracy is required, either one of the thinning processing in the main scanning direction or the thinning processing in the sub scanning direction is not to be performed.

Although the scanner unit 111 is described to perform the operation for reading an image of the document sheet 203 in such a way that the position of the optical system is fixed and, while the document sheet 203 is being conveyed by the ADF, the optical system reads an image of the document sheet 203 (referred to as ADF reading), the configuration is not limited thereto. For example, it is also possible that a document sheet 220 is placed on a platen glass 221 (document positioning plate) and, with the position of the document sheet 220 fixed, the optical system may read an image of the document sheet 220 while the optical system is being moved by the drive of the motor 118 (referred to as pressing plate reading).

Also at the time of pressing plate reading, similar to ADF reading, the thinning processing can be performed on an image of the document sheet 220 in each of the main and the sub scanning directions.

The following describes an operation for outputting an image to a sheet based on image data transferred to the printer unit 121.

The image data transferred to the printer unit 121 is subjected to conversion into laser light according to the image data by the laser unit 222. Then, photosensitive drums 223 to 226 are irradiated with such laser light, and electrostatic latent images according to the laser light are formed on the photosensitive drums 223 to 226, respectively. Developing units 227 to 230 applies toner to portions of the electrostatic latent images on the photosensitive drums 223 to 226, respectively. In a color machine, four photosensitive drums and four developing units are provided for cyan, yellow, magenta, and black, respectively.

The printer unit 121 includes cassettes 251 to 254 and a manual feed tray 250 as sheet holding units included in the feeding unit 123. Each of the cassettes 251 to 254 is drawer shaped and is able to store a plurality of sheets. On the other hand, the manual feed tray 250 is manual feed shaped and is able to hold a plurality of sheets. The printer unit 121 may include the cassettes 251 to 254 and a plurality of manual feed trays 250, and desirably include at least one of the cassettes 251 to 254 and the manual feed tray 250. The following descriptions will be made on the premise that the MFP 1001 according to the present exemplary embodiment includes, for example, the four cassettes 251 to 254 and the one manual feed tray 250.

The printer unit 121 feeds a sheet from one of the cassettes 251 to 254 and the manual feed tray 250. Then, the printer unit 121 transfers toner adhering to the photosensitive drums 223 to 226 onto the fed sheet and then conveys the sheet to a fixing unit 233. The fixing unit 233 applies heat and pressure to the toner to fix it onto the sheet. The sheet that has passed the fixing unit 233 is discharged onto a discharge tray 236 by conveyance roller pairs 234 and 235.

Although the MFP 1001 according to the present exemplary embodiment is described to be a color machine having four photosensitive drums and four developing units, the configuration is not limited thereto. Even if the MFP 1001 is a monochrome machine having one photosensitive drum and one developing unit, the present invention is applicable to the monochrome machine. Although the MFP 1001 according to the present exemplary embodiment is described to print an image on a sheet based on an electrophotographic process, the configuration is not limited thereto. Any other print processes such as an ink-jet process and a heat transfer process are also applicable as long as an image can be printed on a sheet.

Figure 4:
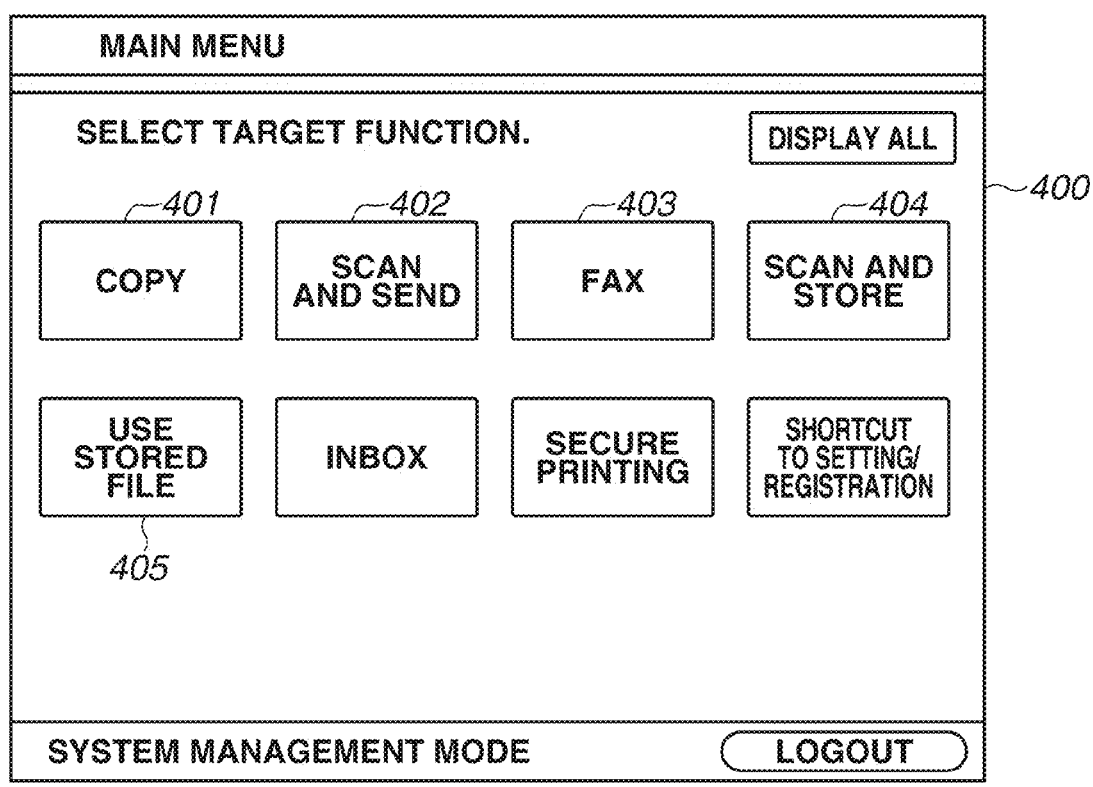
FIG. 4 illustrates a screen according to a first exemplary embodiment.

FIG. 4 illustrates an example of a main screen 400 displayed on the operation unit 160 in the MFP 1001 according to the first exemplary embodiment. The main screen 400 displays selection buttons for calling various functions such as a "Copy" function 401, a "Scan and Send" function 402, and a "Fax" function 403. When a user presses a desired selection button, a screen for using the relevant function is displayed. For example, when the user selects the "Copy" function 401, an execution screen (not illustrated) for using the "Copy" function 401 is displayed on the operation unit 160. Further, for example, when the user selects the "Fax" function 403, an execution screen (not illustrated) for using the "Fax" function 403 is displayed on the operation unit 160.

On the other hand, when the user selects the "Scan and Send" function 402, a "Scan and Send" execution screen 500 (illustrated in FIG. 5) for reading an image of the document sheet 203 and transmitting image data of the read document sheet 203 to any desired destination is displayed on the operation unit 160.

The "Scan and Send" execution screen 500 displays, for example, a setting key 501 for specifying resolution of image data to be transmitted (hereinafter referred to as transmission resolution) and a setting key 502 for specifying a file format of image data to be generated by reading an image of the document sheet 203. The "Scan and Send" execution screen 500 further displays, for example, a setting key 503 for specifying a type of the document sheet 203 to be read and a setting key 504 for transmitting image data of the read document sheet 203 to any desired destination.

Figure 6A:
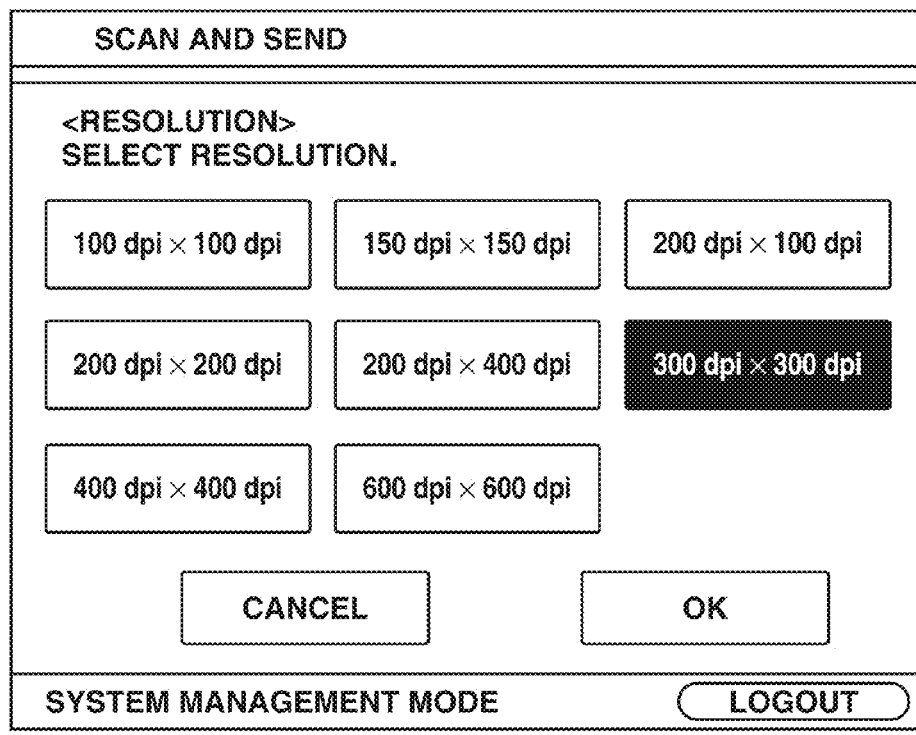
FIGS. 6A, 6B, 6C, and 6D illustrate screens according to the first exemplary embodiment.

When the setting key 501 is pressed, a setting screen 610 illustrated in FIG. 6A is displayed on the operation unit 160. Then, the user is able to select any desired transmission resolution (for example, 300 dpi×300 dpi, 600×600 dpi, etc.) from the setting screen 610. Setting information (transmission resolution) set on the setting screen 610 is stored in the RAM 104 in a nonvolatile way.

An image of the document sheet 203 is read with a predetermined resolution (hereinafter referred to as a reading resolution), and image data generated by reading the image of the document sheet 203 is converted into a transmission resolution specified by the user when the image data is transmitted to any desired destination. The reading resolution is, for example, 600 dpi×600 dpi. On the other hand, when performing the ½ thinning processing in the sub scanning direction, the reading resolution in the sub scanning direction is halved. Therefore, the reading resolution in this case is, for example, 600 dpi×300 dpi. Further, when performing the ½ thinning processing in the main scanning direction, the reading resolution in the main scanning direction is halved. Therefore, the reading resolution in this case is, for example, 300 dpi×300 dpi.

Figure 6B:
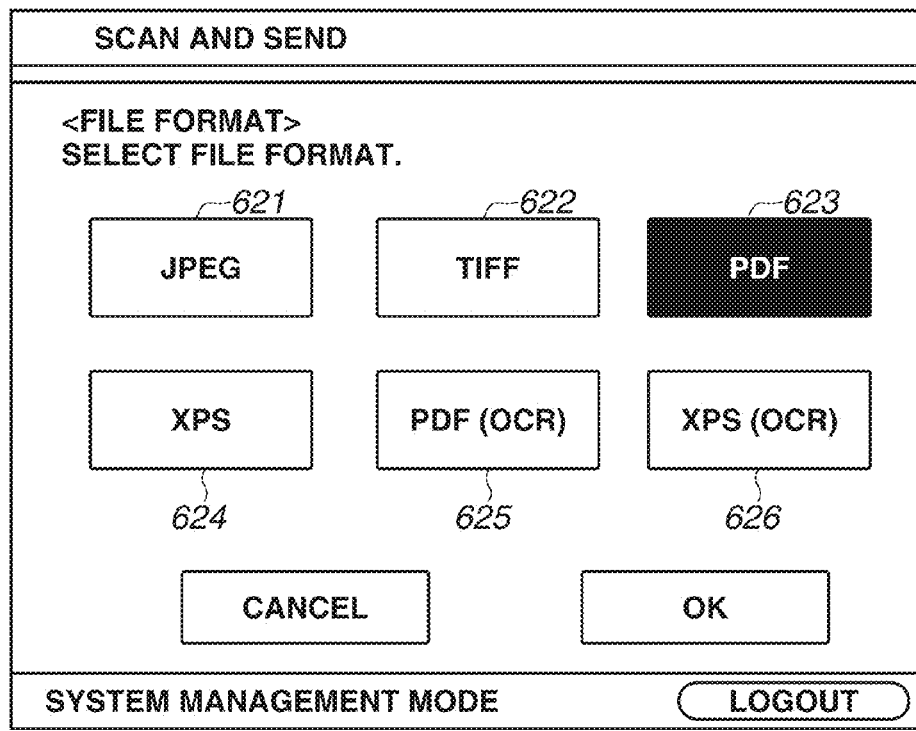

When the setting key 502 is pressed, a setting screen 620 illustrated in FIG. 6B is displayed on the operation unit 160. The user is able to select any desired image data file format from the setting screen 620. Examples of file formats include JPEG 621, Tag Image File Format (TIFF) 622, Page Description Format (PDF) 623, Extensible Markup Language (XML) Paper Specification (XPS) 624, PDF (Optical Character Recognition (OCR)) 625, and XPS (OCR) 626. Setting information (image data file format) set on the setting screen 620 is stored in the RAM 104 in a nonvolatile way.

For example, when PDF (OCR) 625 or XPS (OCR) 626 is selected, to add character information included in the read document sheet 203 to image data as metadata, the character recognition processing is performed on the image data. As described above, the character recognition processing depends on the resolution (reading resolution) for reading an image of the document sheet 203.

Therefore, when performing the character recognition processing on the image data of the read document sheet 203, it is desirable to set the reading resolution to 600 dpi×300 dpi or higher to guarantee the character recognition accuracy.

Figure 6C:
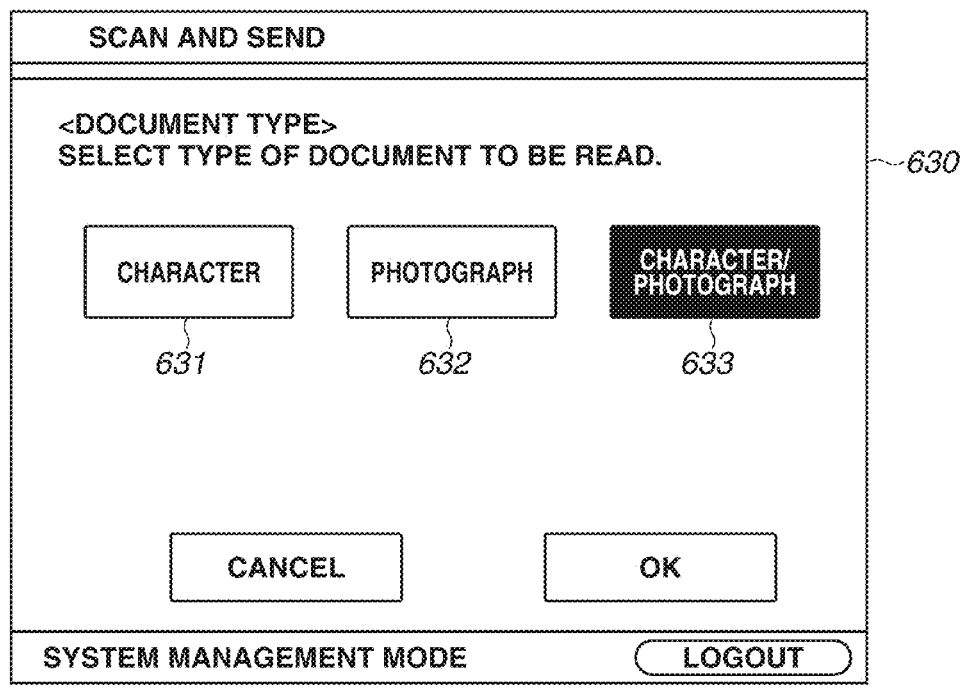

When the setting key 503 is pressed, the setting screen 630 illustrated in FIG. 6C is displayed on the operation unit 160. The user is able to select any desired type of the document sheet 203 to be read from the setting screen 630. Examples of types include Character 631, Photograph 632, and Character/Photograph 633. Setting information (type of the document sheet 203 to be read) set on the setting screen 630 is stored in the RAM 104 in a nonvolatile way.

When reading an image of the document sheet 203 including characters and photographs, processing for separating character and photographic areas is performed on the image data of the document sheet 203 (referred to as image area separation processing). In particular, filtering processing for emphasizing edges and gamma processing are performed on character portions.

Similar to the character recognition processing, image area separation processing depends on the resolution (reading resolution) for reading an image of the document sheet 203. For example, when reading an image of the document sheet 203 with a reading resolution of 300 dpi×300 dpi to generate monochrome binary image data such as TIFF 622, and then performing the image area separation processing on the image data, the image area separation processing fails. In that case, since image processing for characters on the character area is not correctly performed, character crushing occurs and the character visibility in an image degrades.

Accordingly, when performing the image area separation processing on the image data of the read document sheet 203, it is desirable to set the reading resolution to 600 dpi×300 dpi or higher according to the format setting for the image data to be generated to guarantee the image quality due to accuracy of the image area separation processing.

Figure 6D:
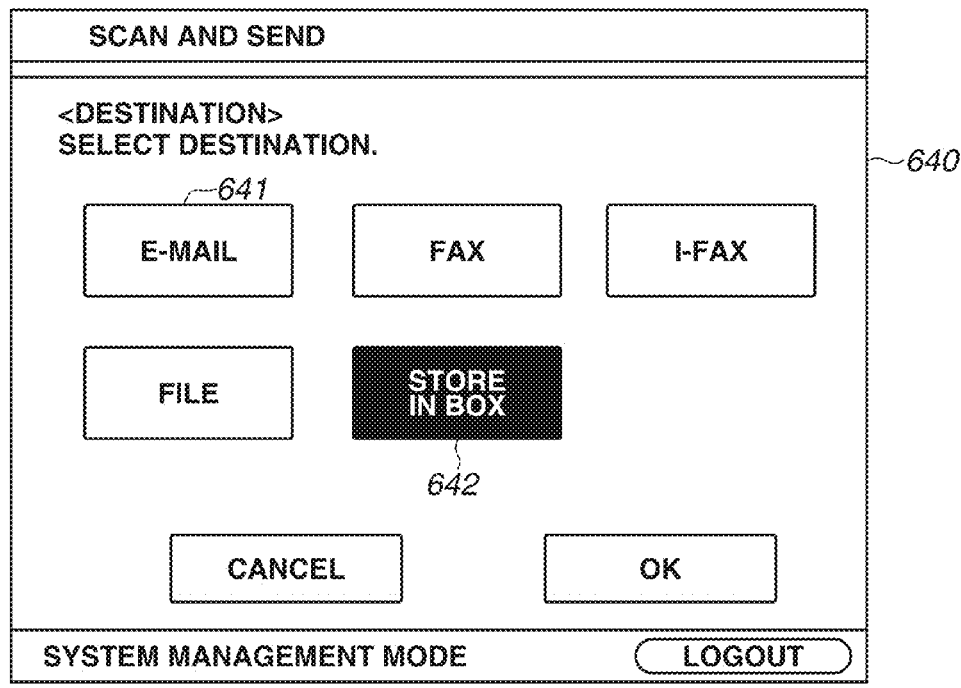

When the setting key 504 is pressed, a setting screen 640 illustrated in FIG. 6D is displayed on the operation unit 160. The user is able to select any desired destination (for example, "E-mail" 641, "Store In Box" 642, etc.) of the image data of the document sheet 203 from the setting screen 640. Setting information (destination of image data) set on the setting screen 640 is stored in the RAM 104 in a nonvolatile way. The user is able to instruct to transmit the image data of the read document sheet 203 to a plurality of destinations by selecting a plurality of destinations from the setting screen 640. Destinations specified by the user are displayed on a destination list 505 on the "Scan and Send" execution screen 500.

The "Store In Box" 642 refers to storing the image data of the read document sheet 203 in the HDD 150 to enable transmitting the image data of the read document sheet 203 at an arbitrary timing instead of immediately transmitting the image data. A "box" refers to each of a plurality of division areas in the storage area of the HDD 150. Image data can be stored in each division area. When the user selects "Store In Box" 642 from the setting screen 640 illustrated in FIG. 6D, a selection screen 710 illustrated in FIG. 7A is further displayed on the operation unit 160. Then, the user is able to select any desired Box No. 711 from the selection screen 710 illustrated in FIG. 7A to specify a box number as a destination of the image data of the read document sheet 203.

Calling a "Scan and Store" function 404 in the main screen 400 illustrated in FIG. 4 enables executing processing for storing the image data of the read document sheet 203 in any desired box similar to the above-described "Store In Box" function 642.

The user is able to use a file stored in any desired box by pressing a selection button for a "Use Stored File" function 405 in the main screen 400 illustrated in FIG. 4. In the main screen 400 illustrated in FIG. 4, when the "Use Stored File" function 405 is called, a selection screen 720 illustrated in FIG. 7B is further displayed on the operation unit 160. When the user selects any desired Box No. 721 on the selection screen 720 illustrated in FIG. 7B, a selection screen 730 illustrated in FIG. 7C is further displayed on the operation unit 160.

Figure 5:
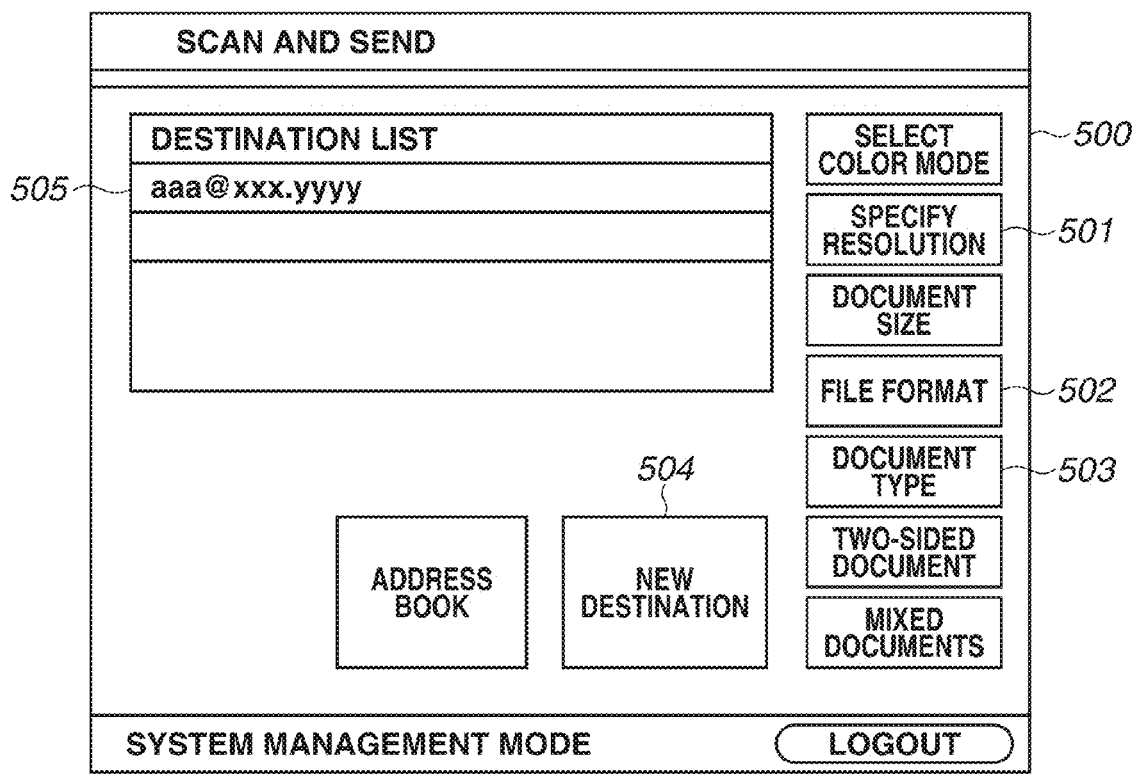
FIG. 5 illustrates a screen according to the first exemplary embodiment.

On the selection screen 730 illustrated in FIG. 7C, the user is able to select any desired file stored in the selected box and then select Print 731 or Send 732. For example, when the user selects Send 732, the "Scan and Send" execution screen 500 illustrated in FIG. 5 is displayed on the operation unit 160. Then, on the "Scan and Send" execution screen 500 illustrated in FIG. 5, the user is able to specify any desired transmission resolution and any desired file format of a transmission target file (image data) and transmit the image data to any desired destination such as the PC 1003 and the facsimile 1004.

In the first exemplary embodiment, the CPU 101 of the controller unit 107 reads an image of the document sheet 203 and then, to enable transmitting image data of the read document sheet 203 at an arbitrary timing, stores the image data in the HDD 150 ("Store In Box" 642). Then, the CPU 101 performs control to guarantee the character recognition accuracy even in a case where the CPU 101 reads image data stored in a box and then performs, for example, the character recognition processing on the image data.

Therefore, the CPU 101 performs control to read an image of the document 203 with a predetermined resolution (for example, 600 dpi×300 dpi) when setting is made to read an image of the document sheet 203 and store the image data of the read document sheet 203 in any desired box.

The control will be described in detail below.

A series of processing for receiving an instruction for executing a job (a "scan and send" job or a "box send" job) and processing for executing the received job by the MFP 1001 according to the first exemplary embodiment will be described in detail below with reference to the flowchart illustrated in FIG. 8. This processing is implemented when the CPU 101 of the controller unit 107 executes a control program read from the ROM 102 or the HDD 150 and then loaded into the RAM 104. A series of processing illustrated in FIG. 8 starts in a state where the user selects the "Scan and Send" function 402 or the "Use Stored File" function 405 on the main screen 400 illustrated in FIG. 4 and the transmission resolution and destinations are preset on the "Scan and Send" execution screen 500 illustrated in FIG. 5.

In step S801, the CPU 101 determines whether an instruction for executing a "box send" job due to the user's pressing an execution button (not illustrated) such as a Start key displayed on the operation unit 160 has been received. A "box send" job refers to a job for reading image data stored in a box (i.e., in the HDD 150) and transmits the image data to any desired destination such as the PC 1003 and the facsimile 1004.

When the CPU 101 determines that the instruction for executing a "box send" job has been received (YES in step S801), the processing proceeds to step S805. On the other hand, when the CPU 101 determines that the instruction has not been received (NO in step S801), the processing proceeds to step S802.

In step S802, the CPU 101 determines whether an instruction for executing a "scan and send" job due to the user's pressing an execution button (not illustrated) such as a Start key displayed on the operation unit 160 has been received. A "scan and send" job refers to a job for reading images of the document sheet 203 by using the scanner unit 111 and transmitting image data of the read document sheet 203 to any desired destination such as the PC 1003 and the facsimile 1004.

When the CPU 101 determines that the instruction for executing a "scan and send" job has been received (YES in step S802), the processing proceeds to step S803. On the other hand, when the CPU 101 determines that the instruction has not been received (NO in step S802), the processing returns to step S801.

In step S803, the CPU 101 acquires setting information for the "scan and send" job on which an execution instruction was received from the RAM 104. Then, the processing proceeds to step S900. The setting information acquired in step S803 includes, for example, the transmission resolution, the file format of image data to be generated by reading an image of the document sheet 203, the type of the document sheet 203 to be read, and the destination of the image data of the read document sheet 203.

In step S900, the CPU 101 performs a series of scan job processing via the scanner unit 111. A scan job refers to a job for reading images of the document sheet 203 by using the scanner unit 111. A scan job to be executed in step S900 will be described in detail below with reference to the flowchart illustrated in FIG. 9.

A series of processing for executing a scan job by the MFP 1001 according to the first exemplary embodiment will be described below with reference to the flowchart illustrated in FIG. 9. This processing is implemented when the CPU 101 of the controller unit 107 executes a control program read from the ROM 102 or the HDD 150 and then loaded into the RAM 104.

In step S901, the CPU 101 determines whether the transmission resolution (in the main scanning direction) set on the setting screen 610 illustrated in FIG. 6A is 300 dpi or less. When the CPU 101 determines that the resolution is 300 dpi or less (YES in step S901), the processing proceeds to step S904. On the other hand, when the CPU 101 determines that the resolution is not 300 dpi or less (NO in step S901), the processing proceeds to step S902.

In step S902, the CPU 101 determines whether the transmission resolution (in the sub scanning direction) set on the setting screen 610 illustrated in FIG. 6A is 300 dpi or less. When the CPU 101 determines that the resolution is 300 dpi or less (YES in step S902), the processing proceeds to step S904. On the other hand, when the CPU 101 determines that the resolution is not 300 dpi or less (NO in step S902), the processing proceeds to step S903.

In step S903, the CPU 101 determines the resolution (reading resolution) for reading an image of the document sheet 203, for example, as 600 dpi×600 dpi. Then, the processing proceeds to step S910.

Figure 8:
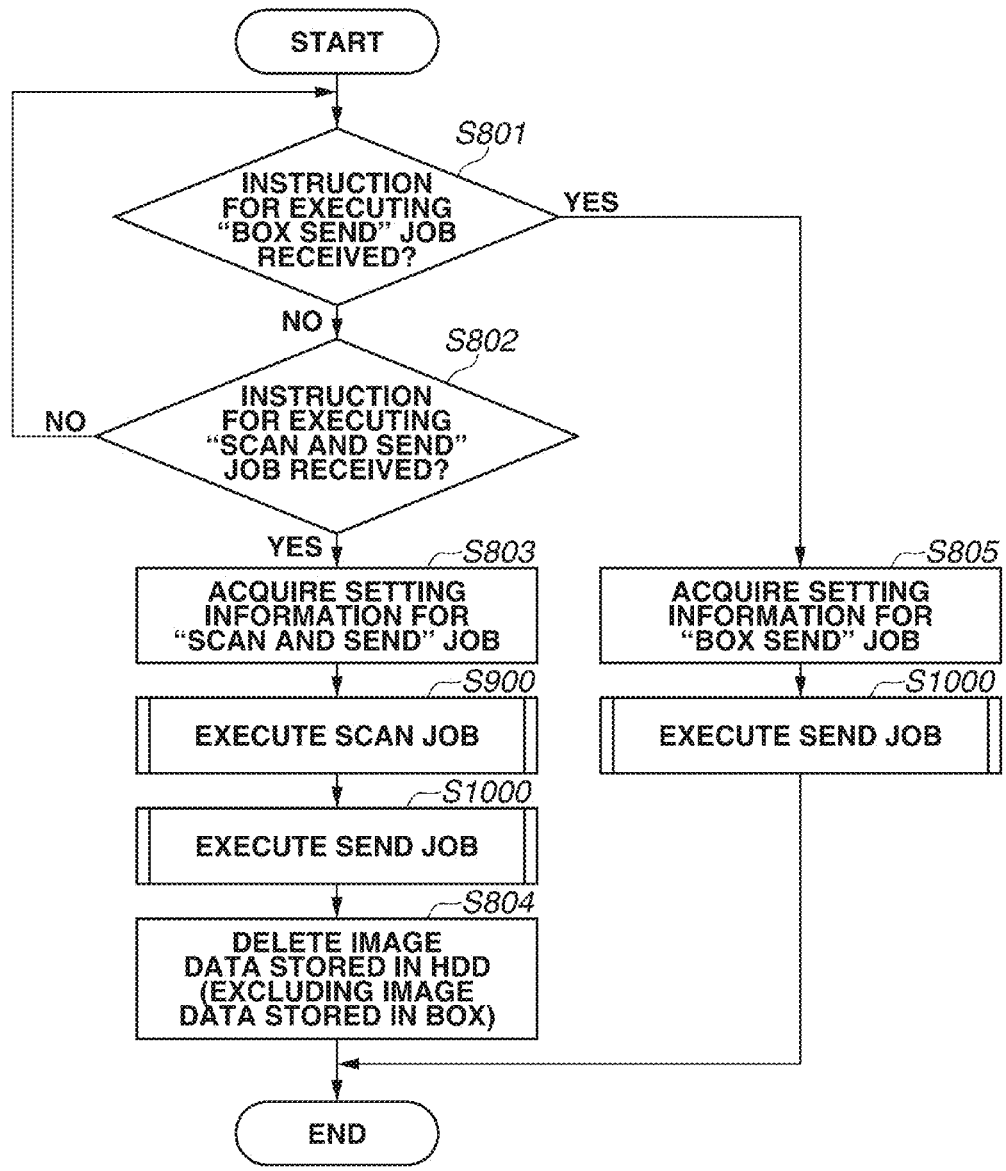
FIG. 8 is a flowchart illustrating an example of control according to the first exemplary embodiment.

In step S904, based on the setting information (the file format of image data to be generated by reading an image of the document sheet 203) acquired in step S803 illustrated in FIG. 8, the CPU 101 determines whether the character recognition processing is to be performed on the image data of the read document sheet 203.

As described above, for example, when PDF (OCR) 625 or XPS (OCR) 626 is selected as an image data file format, the character recognition processing is performed on the image data of the read document sheet 203. Therefore, when a file format subjected to the character recognition processing is selected, the character recognition accuracy needs to be guaranteed. More specifically, for example, when the image data file format is "PDF (OCR) 625" or "XPS (OCR) 626", the CPU 101 determines that a condition in step S904 is satisfied (YES in step S904).

On the other hand, for example, when JPEG 621, TIFF 622, PDF 623, or XPS 624 is selected as an image data file format, the character recognition processing is not to be performed on the image data of the read document sheet 203. More specifically, for example, when the image data file format is "JPEG 621", "TIFF 622", "PDF 623", or "XPS 624", the CPU 101 determines that the condition in step S904 is not satisfied (NO in step S904).

When the CPU 101 determines that the character recognition processing is to be performed (YES in step S904), the processing proceeds to step S908. On the other hand, when the CPU 101 determines that the character recognition processing is not to be performed (NO in step S904), the processing proceeds to step S905.

In step S905, based on the setting information (type of the document sheet 203 to be read) acquired in step S803 illustrated in FIG. 8, the CPU 101 determines whether the image area separation processing is to be performed on the image data of the read document sheet 203.

As described above, when reading an image of the document sheet 203 which includes characters and photographs, the image area separation processing is to be performed on the image data of the read document sheet 203. More specifically, when the type of the document sheet 203 to be read is "Character/Photograph 633", the CPU 101 determines that a condition in step S905 is satisfied (YES in step S905).

On the other hand, when Character 631 or Photograph 632 is selected as the type of document sheet 203 to be read, the image area separation processing is not to be performed on the image data of the read document sheet 203. More specifically, when the type of document sheet 203 to be read is "Character 631" or "Photograph 632", the CPU 101 determines that the condition in step S905 is not satisfied (NO in step S905).

When the CPU 101 determines that the image area separation processing is to be performed (YES in step S905), the processing proceeds to step S906. On the other hand, when the CPU 101 determines that the image area separation processing is not to be performed (NO in step S905), the processing proceeds to step S907.

In step S906, based on the setting information (the file format of the image data generated by reading an image of the document sheet 203) acquired in step S803 illustrated in FIG. 8, the CPU 101 determines whether the image data file format is "TIFF 622".

As described above, when Character/Photograph 633 is selected as the type of document sheet 203 to be read and, for example, TIFF 622 is selected as the image data file format, the image quality due to the image area separation accuracy needs to be guaranteed. More specifically, when the type of the document sheet 203 to be read is "Character/Photograph 633" and when the image data file format is "TIFF 622", the CPU 101 determines that a condition in step S906 is satisfied (YES in step S906). When the CPU 101 determines that the image data file format is "TIFF 622" (YES in step S906), the processing proceeds to step S908. On the other hand, when the CPU 101 determines that the image data file format is not "TIFF 622" (NO in step S906), the processing proceeds to step S907.

Although the CPU 101 is described to determine that the condition in step S906 is satisfied (YES in step S906) when the image data file format is "TIFF 622", the configuration is not limited thereto. For example, to guarantee the image quality due to the image area separation accuracy, the CPU 101 may determine that the condition in step S906 is satisfied (YES in step S906) when the image data file format is "JPEG 621." For example, to guarantee the image quality due to the image area separation accuracy, the user may be allowed to set the result of the determination in step S906 according to the image data file format.

In step S907, based on the setting information (destination of image data) acquired in step S803 illustrated in FIG. 8, the CPU 101 determines whether "Store In Box" is specified as a destination. There is a case where image data stored in a box is read, the file format of the image data is converted, and the character recognition processing is performed on the converted image data. Therefore, when the character recognition processing is performed on the image data, the character recognition accuracy needs to be guaranteed. When the CPU 101 determines that "Store In Box" is specified as a destination (YES in sep S907), the processing proceeds to step S908. On the other hand, when the CPU 101 determines that "Store In Box" is not specified as a destination (NO in step S907), the processing proceeds to step S909. When a plurality of destinations is specified and when "Store In Box" is included as one of the destinations, the CPU 101 determines that a condition in step S907 is satisfied (YES in step S907).

In step S908, the CPU 101 determines the reading resolution, for example, as 600 dpi×300 dpi. Then, the processing proceeds to step S910. In addition, performing the ½ thinning processing in the sub scanning direction with the reading resolution (600 dpi×600 dpi) determined in step S910 enables changing the reading resolution to 600 dpi× 300 dpi. When reading an image of the document sheet 203 with 600 dpi×300 dpi, the number of pixels of the image data input to the controller unit 107 is one half of that in a case of reading with 600 dpi×600 dpi, resulting in reduced image transfer time. Therefore, when reading an image of the document sheet 203 with 600 dpi×300 dpi, the speed of reading an image of the document sheet 203 can be made higher than that in a case of reading with 600 dpi×600 dpi. When the character recognition processing is performed on image data obtained by reading an image of the document sheet 203 with 600 dpi×300 dpi, the character recognition accuracy can be guaranteed. Further, when the image area separation processing is performed on image data obtained by reading an image of the document sheet 203 with 600 dpi×300 dpi, the image quality due to the image area separation accuracy can be guaranteed.

In step S909, the CPU 101 determines the reading resolution, for example, as 300 dpi×300 dpi. Then, the processing proceeds to step S910. In addition, performing the ½ thinning processing in the main scanning direction and the ½ thinning processing in the sub scanning direction with the reading resolution (600 dpi×600 dpi) determined in step S903 enables changing the reading resolution to 300 dpi× 300 dpi. When reading an image of the document sheet 203 with 300 dpi×300 dpi, the number of pixels of the image data input to the controller unit 107 is one fourth of that in a case of reading with 600 dpi×600 dpi, resulting in reduced image transfer time. Therefore, when reading an image of the document sheet 203 with 300 dpi×300 dpi, the speed of reading an image of the document sheet 203 can be higher than that in a case of reading with 600 dpi×600 dpi and a case of reading with 600 dpi×300 dpi.

In step S910, the CPU 101 conveys the document sheet 203 placed on the document tray 202. Then, the processing proceeds to step S911.

In step S911, according to the reading resolution determined in step S903, S908, or S909, the CPU 101 sequentially reads images of the document sheet 203 conveyed in step S910 via the scanner unit 111 to generate image data. Then, the processing proceeds to step S912.

In step S912, the CPU 101 sequentially stores in the HDD 150 the image data generated in step S911. Then, the processing proceeds to step S913.

In step S913, the CPU 101 determines whether the operation for reading images of the document sheet 203 placed on the document tray 202 is completed. When the CPU 101 determines that the reading operation is completed (YES in step S913), the CPU 101 ends execution of a series of the scan job processing related to step S900. Then, the processing proceeds to step S1000 illustrated in FIG. 8. On the other hand, when the CPU 101 determines that the reading operation is not completed (NO in step S913), the processing returns to step S910. Then, the CPU 101 proceeds to the subsequent processing.

This completes detailed descriptions of a series of processing (step S900) in which the MFP 1001 according to the first exemplary embodiment executes a scan job.

Although the reading resolutions determined in steps S903, S908, and S909 are described to be 600 dpi×600 dpi, 600 dpi×300 dpi, and 300 dpi×300 dpi, respectively, the configuration is not limited thereto. The reading resolution determined in step S908 is desirably higher than the reading resolution determined in step S909 as a relation between the reading resolutions determined in steps S903, S908, and S909. Further, the reading resolution determined in step S903 is desirably higher than the reading resolution determined in step S908.

Although a series of the scan job processing illustrated in FIG. 9 is described to be executed by the scanner unit 111 of the MFP 1001, the configuration is not limited thereto. For example, a scan job can be generated by using an external application which operates in the Java® language and executed in step S900. When transmitting image data scanned on the external application side, format conversion of the image data can be performed on the external application side. Therefore, when executing a scan job by using the external application, the reading resolution is fixed, for example, to 600 dpi×600 dpi to guarantee an operation of the external application. More specifically, in step S903, the CPU 101 desirably determines the reading resolution as 600 dpi×600 dpi regardless of whether the transmission resolution in the main scanning direction is 300 dpi or less or the transmission resolution in the sub scanning direction is 300 dpi or less.

In step S1000 illustrated in FIG. 8, the CPU 101 executes a series of send job processing for transmitting the image data of the read document sheet 203 to any desired destination. A send job executed in step S1000 will be described in detail below with reference to FIG. 10.

In step S1001, the CPU 101 reads the image data stored in the HDD 150. Then, the processing proceeds to step S1002. When the CPU 101 determines that the instruction for executing a "scan and send" job has been received in step S802, then in step S1001, the CPU 101 reads the image data generated by the scan job executed in above-described step S900. On the other hand, when the CPU 101 determines that the instruction for executing a "box send" job has been received in step S801, then in step S1001, the CPU 101 reads the image data stored in any desired box specified by the user. After completion of the processing in step S1001, the processing proceeds to step S1002.

In step S1002, the CPU 101 transfers the image data read in step S1001 to the image processing unit 103. The CPU 101 converts the image data into a predetermined transmission resolution (the transmission resolution set on the setting screen 610 illustrated in FIG. 6A). Then, the processing proceeds to step S1003. Before converting the image data into the predetermined transmission resolution, the CPU 101 performs the above-described file format conversion processing and the character recognition processing according to user settings.

In step S1003, the CPU 101 transmits the above-described image data converted in step S1002 to a predetermined destination (the destination set on the setting screen 640 illustrated in FIG. 6D). Then, the processing proceeds to step S804 illustrated in FIG. 8.

This completes detailed descriptions of a series of the processing (step S1000) in which the MFP 1001 according to the first exemplary embodiment executes a send job.

In step S804 illustrated in FIG. 8, the CPU 101 deletes the image data generated by the scan job executed in above-described step S900 out of the image data stored in the HDD 150. However, in step S804, the CPU 101 does not delete the image data stored in the boxes out of the image data stored in the HDD 150.

After completion of the processing in step S804, the CPU 101 ends a series of the processing illustrated in FIG. 8.

On the other hand, in step S805, the CPU 101 acquires from the RAM 104 setting information for the "box send" job on which an execution instruction was received. Then, the processing proceeds to step S1000. The setting information acquired in step S805 includes, for example, the transmission resolution, the file format of the image data generated by reading an image of the document sheet 203, the type of document sheet 203 to be read, and the destination (Box No. 711) of the image data of the read document sheet 203.

In above-described step S1000, the CPU 101 performs a series of the send job processing assuming a user-specified box as a destination. After completion of the processing in step S1000, the CPU 101 ends a series of the processing illustrated in FIG. 8. This completes detailed descriptions of a series of the processing in which the MFP 1001 according to the first exemplary embodiment receives an instruction for executing a job (a "scan and send" job or a "box send" job) and executes the job.

In the first exemplary embodiment of the present invention, the CPU 101 reads an image of the document sheet 203 and then, to enable transmitting image data of the read document sheet 203 at an arbitrary timing, stores the image data in the HDD 150 ("Store In Box" 642). Then, the CPU 101 performs control to guarantee the character recognition accuracy even in a case where the CPU 101 reads image data stored in a box and then performs, for example, the character recognition processing on the image data.

Accordingly, the CPU 101 performs control to read an image of the document 203 with a predetermined resolution (for example, 600 dpi×300 dpi) when setting is made to read an image of the document sheet 203 and store image data of the read document sheet 203 in any desired box.

Therefore, even in a case where the CPU 101 performs file format conversion and further the character recognition processing on image data stored in a box (stored in the HDD 150), the character recognition accuracy can be guaranteed.

The present invention is not limited the above-described exemplary embodiments, and can be modified in diverse ways (including organic combinations of these exemplary embodiments) without departing from the spirit and scope thereof. These modifications are not excluded from the scope of the present invention.

For example, although, in the present exemplary embodiment, an image of the document sheet 203 set on the document tray 202 is read on the document glass 212, the configuration is not limited thereto. The present invention is also applicable to a case where an image of the document sheet 220 placed on the document positioning plate is read on the platen glass 221.

Although, in the present exemplary embodiment, the PC 1003 is described as an example of an external apparatus, the configuration is not limited thereto. The PC 1003 may be a mobile information terminal such as a PDA and a smart phone, a network connection apparatus, and an external dedicated apparatus.

Although, in the present exemplary embodiment, the above-described various control is described to be executed by the CPU 101 of the controller unit 107 of the MFP 1001, a part or all of the above-described various control may be executed by a print control unit such as an external controller provided in a housing separate from the MFP 1001.

While the present invention have specifically been described based on the above-described exemplary embodiments, the spirit and scope of the present invention are not limited to specific descriptions within the specification for those skilled in the art.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image reading apparatus comprising:
   a reading unit which is able to read an image of a document with a plurality of reading resolutions and generate image data;
   a character recognition unit configured to execute character recognition processing;
   a first receiving unit configured to receive a storage instruction for storing the image data in a storage unit; and
   a second receiving unit configured to receive a character recognition instruction for causing the character recognition unit to execute the character recognition processing on the image data which has been stored in the storage unit in accordance with the storage instruction,
   wherein the number of reading resolutions available when the storage instruction is received by the first receiving unit is smaller than the number of reading resolutions available when the storage instruction is not received by the first receiving unit.

2. The image reading apparatus according to claim 1, wherein the reading unit is movable, and a reading resolution is determined according to a speed of the reading unit.

3. The image reading apparatus according to claim 1, further comprising:
   a selecting unit configured to select image data which has been stored in the storage unit;
   a third receiving unit configured to receive a transmission instruction of the image data selected by the selecting unit; and
   a transmitting unit configured to transmit the image data in accordance with the transmission instruction received by the third receiving unit.

4. The image reading apparatus according to claim 1, wherein the plurality of resolutions includes (1) 600 dpi in a main scanning direction and 300 dpi in a sub scanning direction and (2) 300 dpi in a main scanning direction and 300 dpi in a sub scanning direction.

5. The image reading apparatus according to claim 4, wherein the plurality of resolutions further includes 600 dpi in a main scanning direction and 600 dpi in a sub scanning direction.

6. A control method for controlling an image reading apparatus which comprises a reading unit which is able to read an image of a document with a plurality of reading resolutions and generate image data, and a character recognition unit configured to execute character recognition processing, the control method comprising:
   receiving a storage instruction for storing the image data in a storage unit; and
   receiving a character recognition instruction for causing the character recognition unit to execute the character recognition processing on the image data which has been stored in the storage unit in accordance with the storage instruction, wherein the number of reading resolutions available when the storage instruction is received is smaller than the number of reading resolutions available when the storage instruction is not received.

7. A non-transitory computer readable storage medium for storing a computer program for controlling an image reading apparatus which comprises a reading unit which is able to read an image of a document with a plurality of reading resolutions and generate image data, and a character recognition unit configured to execute character recognition processing, the computer program comprising:

a code to receive a storage instruction for storing the image data in a storage unit; and a code to receive a character recognition instruction for causing the character recognition unit to execute the character recognition processing on the image data which has been stored in the storage unit in accordance with the storage instruction, wherein the number of reading resolutions available when the storage instruction is received is smaller than the number of reading resolutions available when the storage instruction is not received.

* * * * *